May 6, 1930.  R. SELIGMAN  1,757,880
STERILIZING AND PRESERVING LIQUIDS
Filed March 31, 1926   5 Sheets-Sheet 1

INVENTOR:
Richard Seligman.
Ernest Wilkinson
Attorney.

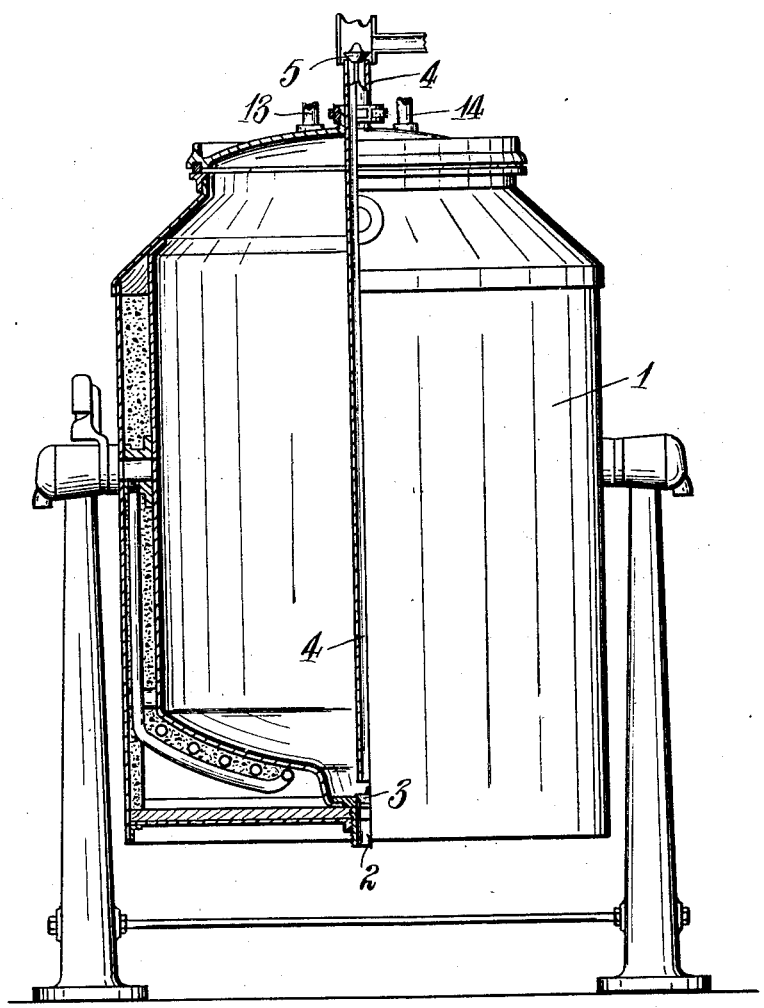

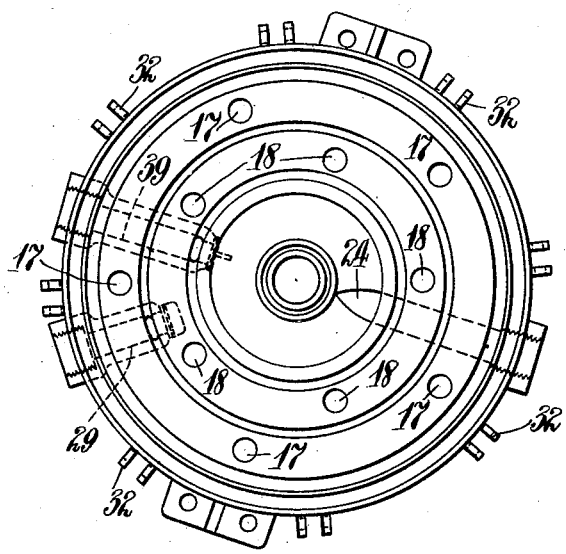
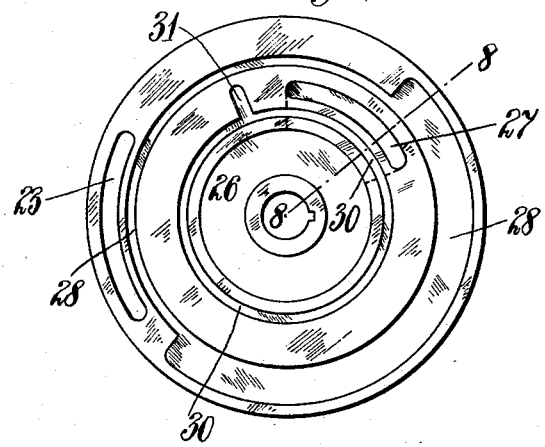
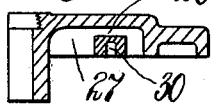

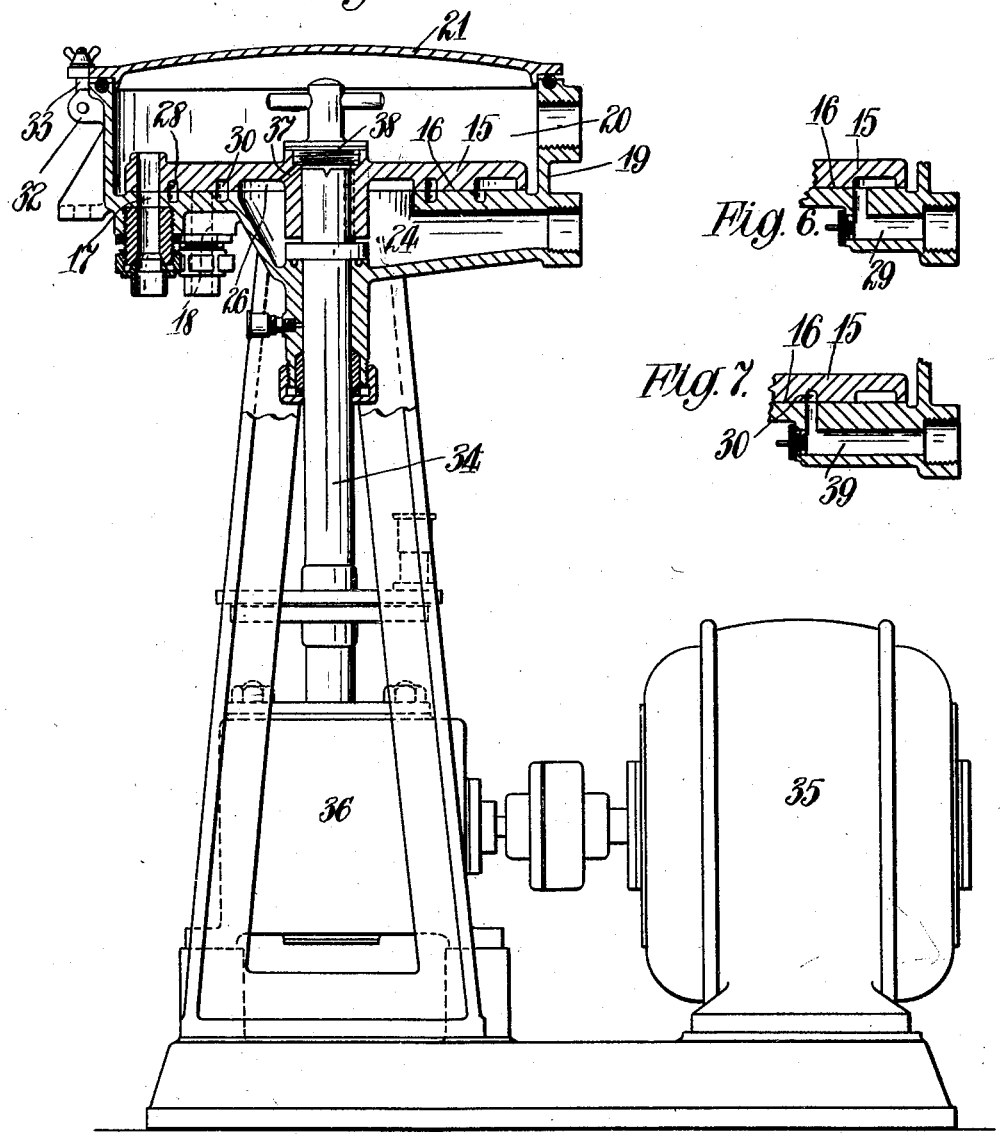

Patented May 6, 1930

1,757,880

UNITED STATES PATENT OFFICE

RICHARD SELIGMAN, OF WANDSWORTH, LONDON, ENGLAND, ASSIGNOR TO THE ALUMINIUM PLANT & VESSEL COMPANY, LIMITED, OF LONDON, ENGLAND

STERILIZING AND PRESERVING LIQUIDS

Application filed March 31, 1926, Serial No. 98,837, and in Great Britain February 17, 1926.

This invention relates to improvements in and relating to sterilizing and preserving liquids of the kind in which the liquid is caused to flow into the holder or tank and is discharged therefrom by a difference in pressure on the opposite sides of the liquid.

An object of the present invention is to provide a simple and practical apparatus which is applicable to pasteurizing milk by the positive "holding" process which for general commercial use consists in causing the milk to run consecutively into a number of holders, each of which is filled in turn, the milk held in them for a definite length of time before being discharged, and the holders then emptied in turn. Another object is to so release the pressure employed in discharging the holders of their charges that at the time compressed air or other gas is being discharged from any given holder that holder shall have no ordered communication with any other. Another object is to prevent the blowing back into the holder of any fluid when the exhaust from the holder is broken or cut off, or when pressure is applied to fill the holder.

The accompanying drawings show by way of example forms of apparatus embodying the present invention.

Figure 1:
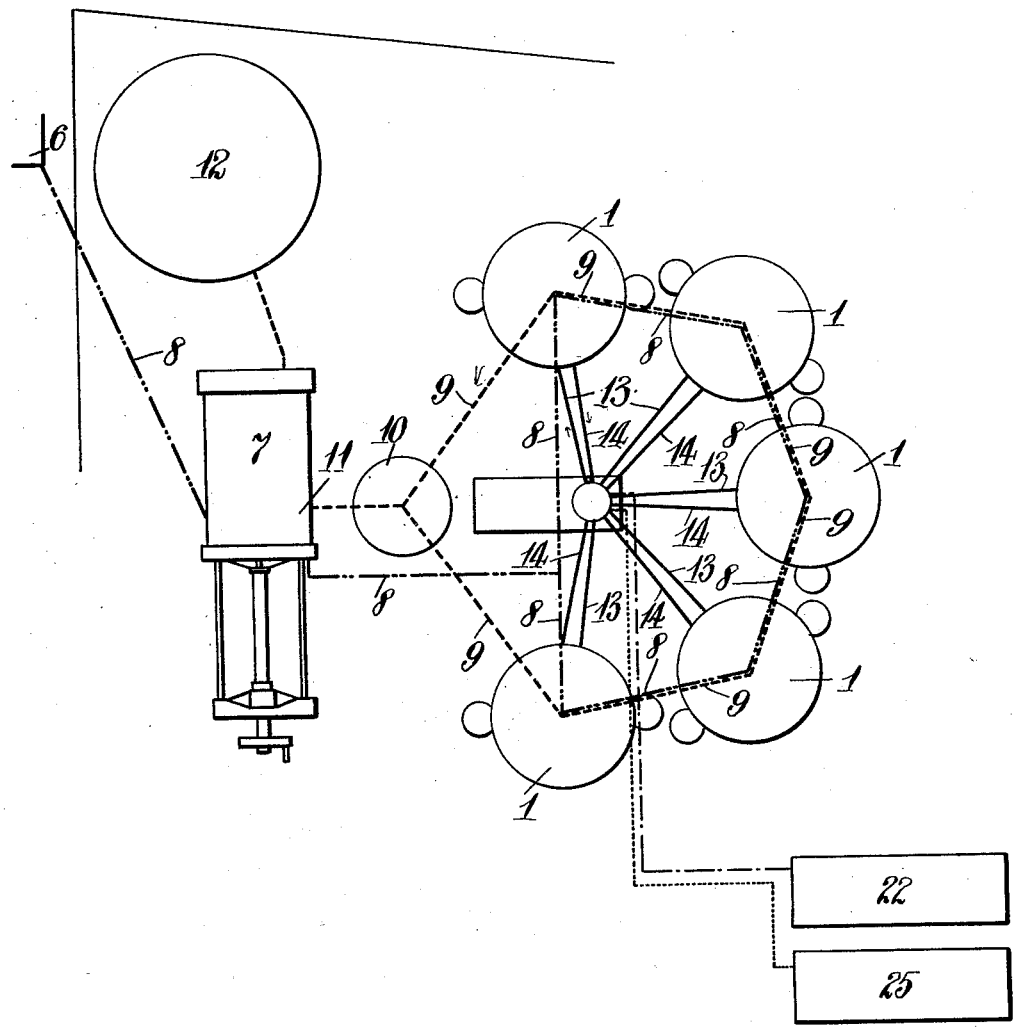
Figure 9:
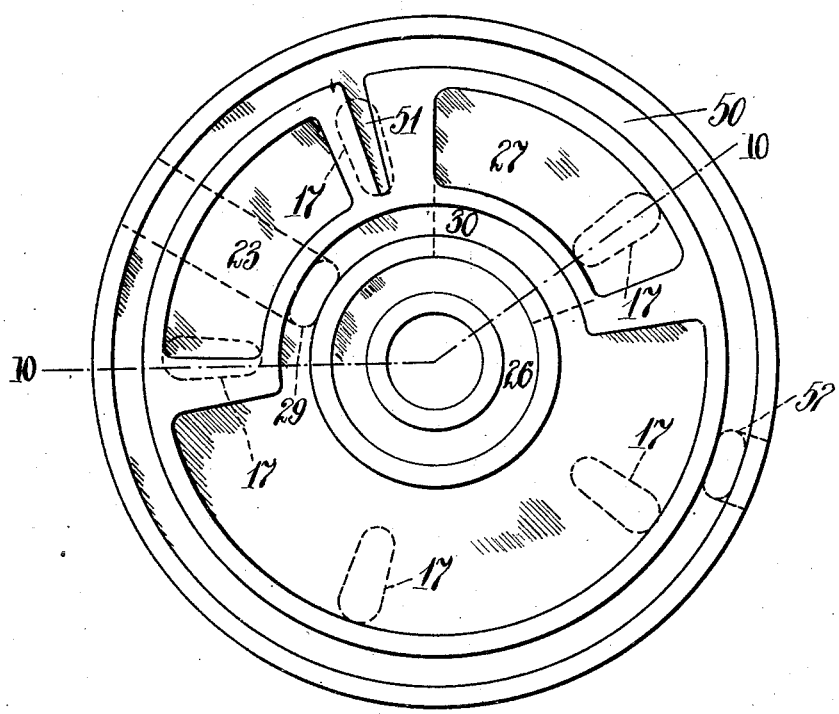

Fig. 1 is a diagrammatic view of a general lay-out of apparatus. Fig. 2 a part vertical section of a holding vessel. Fig. 3 is a plan view of the controller casing with the cover removed. Fig. 4 is a part sectional elevation of the controller. Fig. 5 is an under plan view of the rotating disc. Fig. 6 is a detail view of the vacuum release and Fig. 7 a detail view of the compressed air release. Fig. 8 is a part sectional view of the controller. Fig. 9 is an under plan view of a modified form of rotating disc, and Fig. 10 is a sectional view on the line 10—10 of Fig. 9.

Similar reference characters refer to similar parts throughout the several views in the drawings.

Figure 10:
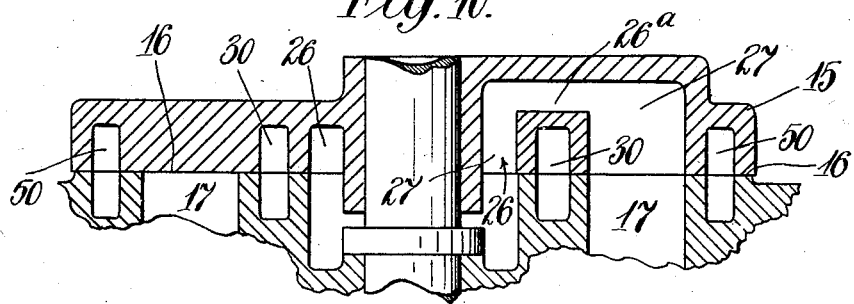

In the form of apparatus more particularly illustrated in Figs. 1, 9 and 10, Fig. 1 being read as if only single connexions 13 are provided in the cover or other part of the holder, the application of reduced or increased pressure is effected by a controller for controlling the connexion of the holders by way of the connexions 13 to the sources of vacuum and compressed air.

For the purpose of understanding the form of apparatus now being described, Fig. 4 may be read as if there is only a set of single passages 17, and as if the valve and its seating is as shown in Figs. 9 and 10.

With this explanation the controller comprises a casing 19 having a disc 15 rotating on a seating 16, in which seating are a number of passages 17. The passages 17 indicated also in dot outline in Fig. 9, communicate with the connexions 13 leading to the holders.

The space 20 above the disc 15 is enclosed as by a cover 21, and the space 20 communicates with a source of compressed air 22. The compressed air passes to the separate holders in succession through an arcuate port 23 in the disc 15. The space 24 below the disc seating is connected to a vacuum pump 25 and is put in communication with the holders in succession through an annular recess 26 and a branch recess or port 27 in the underside of the disc 15. Communication between 26 and 27 is by way of a space bridge 26ª (Fig. 10) over a channel 30 hereinafter referred to. Interposed between the recess 26 and the port 23 is the annular channel 30 in the underside of the disc 15 communicating with the atmosphere through a passage 29 in the casing. This channel 30 prevents compressed air from leaking across between 23 and 26. On the underside of the disc 15 is a second annular channel 50, having a radial extension 51. This channel 50 communicates with atmosphere through a passage 52 in the casing.

The vacuum release channel 30 is made circumferentially continuous in order to be continuously in communication with atmosphere through the passage 29 in the casing, but is varied in width as shown so as to permit of the disc valve which travels over the ring series of ports 17 to be portioned out for controlling the various stages of the cycle of operation.

Thus in the space left between the ends of the wider portion of the vacuum release channel 30, the branch recess 27 of the vacuum chamber opens; the arcuate port 23 is provided; and between the arcuate port 23 and the vacuum branch 27 is the radial extension 51 of the second annular channel 50.

32 are lugs to take the swing bolts 33 of the cover 21.

The disc 15 is mounted on a spindle 34 which is driven from an appropriate drive, such as a motor 35 through appropriate reduction gear 36. The disc 15 is removable from the spindle 34, and to allow the disc to readily seat itself, a vent 37 is provided, which is closed by a screw-in plug 38.

The holder has a single connexion 13 and a single passage 17 allotted thereto, the passage 17 co-operating with 13.

In the cycle of operations controlled by the rotation of the disc 15, each of the ring series of ports 17 is related in succession to vacuum, atmosphere, pressure, and pressure release.

The relation is through the connexion 13, passage 17, port 27, recess 26, space 24, etc., which causes a flow of milk to the particular holder under the influence of vacuum.

As the rotating disc 15 moves on, the port 27 is shut off from the passage 17, which is then related to the vacuum release channel 30, which allows air to enter the holder through 29, 30, 17 and connexion 13, the annular channel 30 allowing the holder during the whole of the holding time to remain in communication with the atmosphere.

At the end of the holding period the channel 30 is shut off from the given passage 17 and the arcuate port 23 is then related to that passage, this allows compressed air from the chamber 20 to pass to the holder and discharge the held milk therefrom.

When the discharging is completed, the holder being now full of compressed air, the passage 17 is shut off from port 23, and the extension 51 and the channel 50 are related to the passage 17 and as 50 communicates through 52 with the atmosphere the compressed air in the holder is allowed to escape.

On the extension 51 leaving the passage 17, the vacuum port 27 is again related to the passage 17, and the cycle in the related holder of vacuum, atmospheric pressure, compressed air application, and pressure release is repeated. It will be noted that the relation to atmospheric pressure and pressure release is effected by means of separate and distinct paths notwithstanding the single connexion 13 from the passage 17 to the holder so that at the time compressed gas is being discharged from any given holder, that holder has no ordered communication with any other.

This object can also be achieved in the form of apparatus more particularly illustrated by Figs. 1 to 8, in which each of the holders is related to vacuum and pressure apparatus by a controller for example a master control through separate connexions therewith.

Again in this form of apparatus, the milk is caused to flow into the holders 1 by means of a vacuum, and is discharged by admitting compressed air, a number of holders 1 being thus filled and discharged in cyclical order.

The milk enters the holders 1 through inlets 2, having non-return valves 3, the inlets being at the bottom of the holders, and leaves through pipes 4 extending nearly to the bottom of the holders 1, these pipes 4 having non-return valves 5 above the highest level of the milk in the holder, so that should there be any leakage this passes from the "held" milk to the "unheld". The non-return valves 3 allow the milk to pass in but not out of the holder, and the non-return valves 5 allow the milk to pass out but not into the holder.

The inlets 2 are connected on the outside to the hot milk supply, this coming from the raw milk container 6 through a heater 7, either directly by a pipe 8 common to all the holders 1, or indirectly through an intermediate receptacle. The milk may pass from the outlets 4 in the holders 1 by means of pipes 9 to a balance tank 10 provided with a float-controlled air vent so as to render the flow to the coolers continuous. From this tank 10 the milk goes to a cooler 11, which cooler may be partly enclosed within the cooler end of the heater 7 for regenerative effect. From the cooler 11 the milk passes to a receptacle 12.

The differences of pressure for filling and emptying each holder 1 may be conveniently effected by the application at suitable times of vacuum, or compressed air or other gas which may be filtered or sterilized if desired. For applying such differences of pressure connexions 13 and 14 are provided in the cover or other part of the holder 1. Appropriate means may be embodied to close these connexion before the milk rises high enough in the holder to reach these.

This application of reduced or increased pressure is effected by a controller for controlling the connexion of the holders to the sources of vacuum and compressed air.

As shown in the drawings the controller comprises a casing 19 having a disc 15 rotating on a seating 16, in which seating are a number of passages 17 and 18. The passages 17 communicate with the connexions 13 leading to the holders, and the passages 18 communicate with the connexions 14 leading to the holders.

The space 20 above the disc 15 is enclosed as by a cover 21, and the space 20 communicates with a source of compressed air 22. The compressed air passes to the separate holders in succession through an arcuate port 23 in the disc 15. The space 24 below the disc seating is connected to a vacuum pump 25 and is put in communication with the holders in succession through an annular recess 26 and a branch recess or port 27 in the underside of the disc 15. Communication between 26 and 27 is by way of a bridge 26ª (Fig. 8) over a channel 30 hereinafter referred to. Interposed between the recess 26 and the port 23 is an annular channel 28 in the underside of the disc 15 communicating with the atmosphere through a passage 29 in the casing. This channel 28 prevents air from leaking across between 23 and 26. On the underside of the disc is a second annular channel 30 having a radial extension 31. This channel 30 communicates with atmosphere through a passage 39 in the casing.

32 are lugs to take the swing bolts 33 of the cover 21.

The disc 15 is mounted on a spindle 34 which is driven from an appropriate drive, such as a motor 35 through appropriate reduction gear 36. The disc 15 is removable from the spindle 34, and to allow the disc to readily seat itself a vent 37 is provided, which is closed by a screw-in plug 38.

Each holder has two connexions 13 and 14 and two passages 17 and 18 allotted thereto, the passage 17 co-operating with 13 and the passage 18 co-operating with 14.

Now assuming the rotating disc 15 to be in such a position that the port 27 is over a passage 18. Air will be exhausted from the appropriate holder through the connexion 14, passage 18, port 27, recess 26, space 24, etc. This causes a flow of milk to the particular holder under the influence of the vacuum.

As the rotating disc moves on, the port 27 is shut off from the passage 18, and the annular channel 28 is presented to the passage 17. This releases the vacuum in the holder by permitting air to enter the holder from 29 through 28, 17, and the connexion 13. Thus during the holding period of the milk in the holder, the holder is in communication with the atmosphere.

At the end of the holding period the channel 28 is shut off from 17 and the arcuate port 23 is then presented to 17. This allows compressed air from the chamber 20 to be admitted to the holder, thus effecting the discharge. When the discharge is completed, the holder being full of compressed air the port 23 is shut off from 17, and the extension 31 of the channel 30 is presented to the passage 18, and as 30 is in communication through 39 with the atmosphere the compressed air in the holder is allowed to escape. On the extension 31 leaving the passage 18, the vacuum port 27 is again presented to the passage 18 and the cycle in the holder of vacuum, atmospheric pressure, compressed air application, and release repeated.

It will be noted that the direction of travel of air or other gas in the connexions 13 and 14 is always in one direction, that in 13 being inwards to the holder, and that in 14 being outwards from the holder.

Through the connexion 14 air is exhausted from the holder and compressed air allowed to escape therefrom, and through the connexion 13 compressed air is supplied to the holder, and atmospheric air flows into the holder.

If the connexion 14 becomes soiled, nothing goes back to the holder. The other connexion 13 which leads air into the holder only has washed and filtered air going therethrough.

The holders may be mounted on a frame which can be rotated for cleaning purposes, etc.

The movement imparted to the rotating disc may be continuous or intermittent.

As many embodiments of the present invention may be made, and as the parts herein described may be varied in many ways, all without departing from the scope of the invention, it is to be understood that all matter herein set forth or shown in the accompanying drawings is to be interpreted as illustrative and not in a limiting sense.

What I claim is:—

1. In combination with a tank, a casing connected to the tank and having separate vacuum and compressed air chambers, and a rotary valve in said casing having a port to initially place the tank in communication with the vacuum chamber, a second port to vent the tank to atmosphere, a third port to place the tank in communication with the compressed air chamber, and a fourth port to vent the tank to atmosphere, said fourth port being separate and distinct from the second port.

2. In combination with a plurality of tanks, a casing having individual connections to said tanks and provided with separate vacuum and compressed air chambers, and movable means in the casing for controlling the connection to each tank without regard to the other tanks constructed to in sequence connect each tank separately to the vacuum chamber, to atmosphere, to the compressed air chamber, and again to atmosphere, without at the same time establishing compressed air connection to any other tank.

3. In combination with a plurality of tanks, a casing having individual connections to said tanks and provided with separate vacuum and compressed air chambers, and a rotary valve in said chamber having ports displaced angularly and adapted to be sequentially moved past each of said connections whereby to connect each tank without reference to the other tanks in sequence to the vacuum chamber, atmosphere, the compressed air chamber, and again to atmosphere, without at the same time establishing compressed air connection to any other tank.

4. In combination with a tank, a casing connected to the tank and having separate vacuum and compressed air chambers, and a rotary valve in the casing having a port in communication with the vacuum chamber and adapted in one angular position of the valve to place the tank under the influence of vacuum to draw material into the tank, a second port in communication with atmosphere to register with the tank connection during the holding period of the material in the tank, a third port in communication with the compressed air chamber to register with the tank connection whereby to drive the material out of the tank, and a fourth port to subsequently vent the tank to atmosphere, said fourth port being separate and distinct from the second port.

5. In combination with a tank, a casing connected to the tank and having separate vacuum and compressed air chambers, and a rotary valve in the casing having a central annular channel at all times in communication with said vacuum chamber and a circumferentially restricted port communicating with said channel and adapted to register with the tank connection, said valve also having a circumferentially elongated port communicating with atmosphere displaced from said restricted port and adapted to subsequently register with the tank connection, said valve further having an annular venting channel in communication with the atmosphere at all times and provided with a radially offset portion between said first-mentioned and third ports and adapted to register with the tank connection, said annular venting channel and radially offset portion being separate and distinct from said other channel and ports.

In testimony whereof, I affix my signature.

RICHARD SELIGMAN.